(12) United States Patent
Kailas et al.

(10) Patent No.: US 8,997,030 B1
(45) Date of Patent: *Mar. 31, 2015

(54) ENHANCED CASE-SPLITTING BASED PROPERTY CHECKING

(71) Applicant: International Business Machines Corporation, Armonk, NY (US)

(72) Inventors: Krishnan K. Kailas, Tarrytown, NY (US); Hari Mony, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,880

(22) Filed: Oct. 28, 2013

Related U.S. Application Data

(63) Continuation of application No. 14/023,713, filed on Sep. 11, 2013.

(51) Int. Cl.
*G06F 17/50* (2006.01)

(52) U.S. Cl.
CPC ................................. *G06F 17/5081* (2013.01)
USPC ........................................................ 716/107

(58) Field of Classification Search
CPC ................................ G06F 17/30; F06F 17/50
USPC ........................................................ 716/107
See application file for complete search history.

(56) References Cited

U.S. PATENT DOCUMENTS

| | | | |
|---|---|---|---|
| 6,714,902 B1 | 3/2004 | Chao et al. | |
| 8,181,134 B2 | 5/2012 | Baumgartner et al. | |
| 8,285,527 B2 | 10/2012 | Rahim et al. | |
| 2004/0177332 A1* | 9/2004 | Pandey et al. | 716/5 |
| 2006/0129952 A1* | 6/2006 | Baumgartner et al. | 716/2 |
| 2006/0190873 A1* | 8/2006 | Baumgartner et al. | 716/5 |
| 2007/0226664 A1 | 9/2007 | Gemmeke et al. | |
| 2007/0226666 A1* | 9/2007 | Ganai et al. | 716/5 |
| 2007/0294650 A1* | 12/2007 | Pandey et al. | 716/4 |
| 2010/0257494 A1* | 10/2010 | Pouarz et al. | 716/5 |

OTHER PUBLICATIONS

Schubert, "Power7—Verification Challenge of a Multi-core Processor," 2009 IEEE/ACM International Conference on Computer-Aided Design, Nov. 2009, San Jose, CA, ppl. 809-812.

(Continued)

*Primary Examiner* — Vuthe Siek
*Assistant Examiner* — Mohammed Alam
(74) *Attorney, Agent, or Firm* — VanLeeuwen & VanLeeuwen; Steven L. Bennett

(57) ABSTRACT

An approach is provided in which a model verification system partitions one of a design specification's circuit design properties into multiple unsolved cases. The model verification system then performs property checking on one of the unsolved cases against a corresponding circuit design model, which results in a property checked solved case and a subset of unsolved cases. In turn, the model verification system performs sequential equivalence checking on one or more of the subset of unsolved cases by checking their sequential equivalence against the property checked solved case. As a result, the model verification system stores the cases as sequentially equivalent solved cases and verifies of a portion of the design specification against a portion of the circuit design model.

8 Claims, 9 Drawing Sheets

(56) References Cited

OTHER PUBLICATIONS

Koelbl et al., "Embedded Tutorial: Formal equivalence checking between system-level models and RTL," 2005 IEEE/ACM International Conference on Computer-Aided Design, Nov. 2005, San Jose, CA, pp. 963-970.

Kumar, "Formal Verification of Hardware: Misconception and Reality," Wescon 98, Anaheim, CA, Sep. 1998, pp. 135-138.

Sawada et al., "Hybrid Verification of a Hardware Modular Reduction Engine," International Business Machines Corporation, Armonk, NY, Nov. 2011, 8 pages.

Baumgartner et al., "Scalable Sequential Equivalence Checking across Arbitrary Design Transformation," 2006 IEEE International Conference on Computer Design, Oct. 2006, San Jose, CA, 8 pages.

Jain et al., "Symbolic Simulation Based Verification Using Parametric Boolean Expressions," Department of Computer Science, University of Utah, Salt Lake City, UT, Dec. 1991, 24 pages.

Aagaard et al., Formal verification using parametric representations of Boolean constraints, Proceedings of the 36th annual ACM/IEEE Design Automation Conference, New Orleans, LA, Jun. 1999, pp. 402-407.

Paruthi et al., "Efficient Symbolic Simulation via Dynamic Scheduling, Don't Caring, and Case Splitting," Charme'05, Proceedings of the 13 IFIP WG 10.5 International Conference on Correct Hardware Design and Verification Methods, Saarbrijken, Germany, Oct. 2005, pp. 114-128.

McMillan, "A Methodology for Hardware Verification using Compositional Model Checking," Science of Computer Programming, vol. 37, Issues 1-3, May 2000, pp. 279-309.

* cited by examiner

Serial Processor Pseudocode
600

```
U: set of 2^N unsolved cases {u_0, u_1, ..., u_({2^N)-1}}
SG : Solved Group -- set of cases that are sequentially equivalent to each other {s_0, s_1, ..., s_n}
S: Set of solved groups {sg_0, sg_1, ..., sg_n}
T_pc_i: time taken for property checking for case u_i
T_pc_min: minimum time taken for property checking (among all successful property checking runs)
T_SEC_j_sg_k: time taken for SEC between case u_j and representative case from solved group sg_k
T_CUM_SEC_j: cumulative time taken for SEC for case u_j(performing SEC with each solved group)

S={}
num_solved_groups=0;
T_pc_min=0;
forall u_i \in U
    Apply property checking for case u_i                                    — 610
    if (counter_example generated) then
        return counter_example to user                                      — 615
        goto DONE;
    end if
    T_pc_i = Time taken for performing property checking for case u_i       — 620
    num_solved_groups++;
    Create new solved group SG_{num_solved_groups}                          — 625
    move u_i to SG_{num_solved_groups}
    Label SG_{num_solved_groups} with T_pc_i and case attributes            — 630
    move SG_{num_solved_groups} to S
    T_pc_min = minimum(T_pc_i, T_pc_min)                                    — 635 forall u_j \in U
        select SG_k based on PC time for each solved group and case attributes  — 640
        T_CUM_SEC_j=0;

APPLY_SEC:
        s_l = sample case from SG_K                                         — 645
        T_SEC_j_sg_k = SEC(s_l, u_j);
        if (s_l equivalent to u_j) then                                     — 650
            move u_j to SG_k and label SG_k with T_SEC_j_sg_k
        end if
        T_CUM_SEC_j += T_SEC_j_sg_k;
        if (T_CUM_SEC_j > T_pc_min) then                                    — 655
            goto exitSEC;
        end if
        if (remaining solved groups) then                                   — 660
            select SG_k based on PC time for each solved group and case attributes
            goto APPLY_SEC;
        end if
    end for
exitSEC:
end for
```

FIG. 6

Parallel Processor Pseudocode 700

```
S={}
num_solved_groups=0;
T_pc_min=0;

Initial: Select NUM_PROCESSORS cases among the initial set of cases and run property checking on them parallely Parallel Loop: Case u_i \in U has completed property checking and processor P_i is free
  If (counter_example generated) then                                                         ⟵ 720
    return counter_example to user
    Kill all running processes
    goto DONE:
  end if
  T_pc_i = Time taken for performing property checking for case u_i
  num_solved_groups++;
  Create new solved group SG_{num_solved_groups}
  move u_i to SG_{num_solved_groups}
  Label SG_{num_solved_groups} with T_pc_i and case attributes
  move SG_{num_solved_groups} to S
  T_pc_min = minimum(T_pc_i, T_pc_min)

Select an u_j in U that is not being property checked:
  if (u_j is not NULL) then  // there are unsolved cases still available
    select SG_k based on PC time for each solved group and case attributes
    T_CUM_SEC_j=0;

APPLY_SEC:
    s_l = sample case from SG_k
    T_SEC_j_sg_k = SEC(s_l, u_j) on processor P_i;
    if (s_l equivalent to u_j) then
      move u_j to SG_k and label SG_k with T_SEC_j_sg_k
    end if
    T_CUM_SEC_j += T_SEC_j_sg_k;                              ⟵ 730
    if (T_CUM_SEC_j > T_pc_min) then
      goto exitSEC:
    end if
    if (remaining solved groups) then
      select SG_k based on PC time for each solved group and case attributes
      goto APPLY_SEC:
    end if
  exitSEC:                                                       ⟵ 735
    Apply property checking on u_j on Processor P_i
  end if else
    // There are cases that are being actively worked on and we have available processors
    Select u_m \in U based on a selection crietria
    if(u_m is not NULL) then                                                                  ⟵ 740
        forall SG_k in S such that u_m has not been SEC-ed with SG_k
        s_l = sample case from SG_k
        SEC(u_m, s_l)
        if(s_l equivalent to u_m) them
          move u_j to SG_k and label SG_k with T_SEC_j_sg_k
            break;
        end if
      end for
    end if
    else
      release processor P_i
    end
  end Select
end
```

FIG. 7

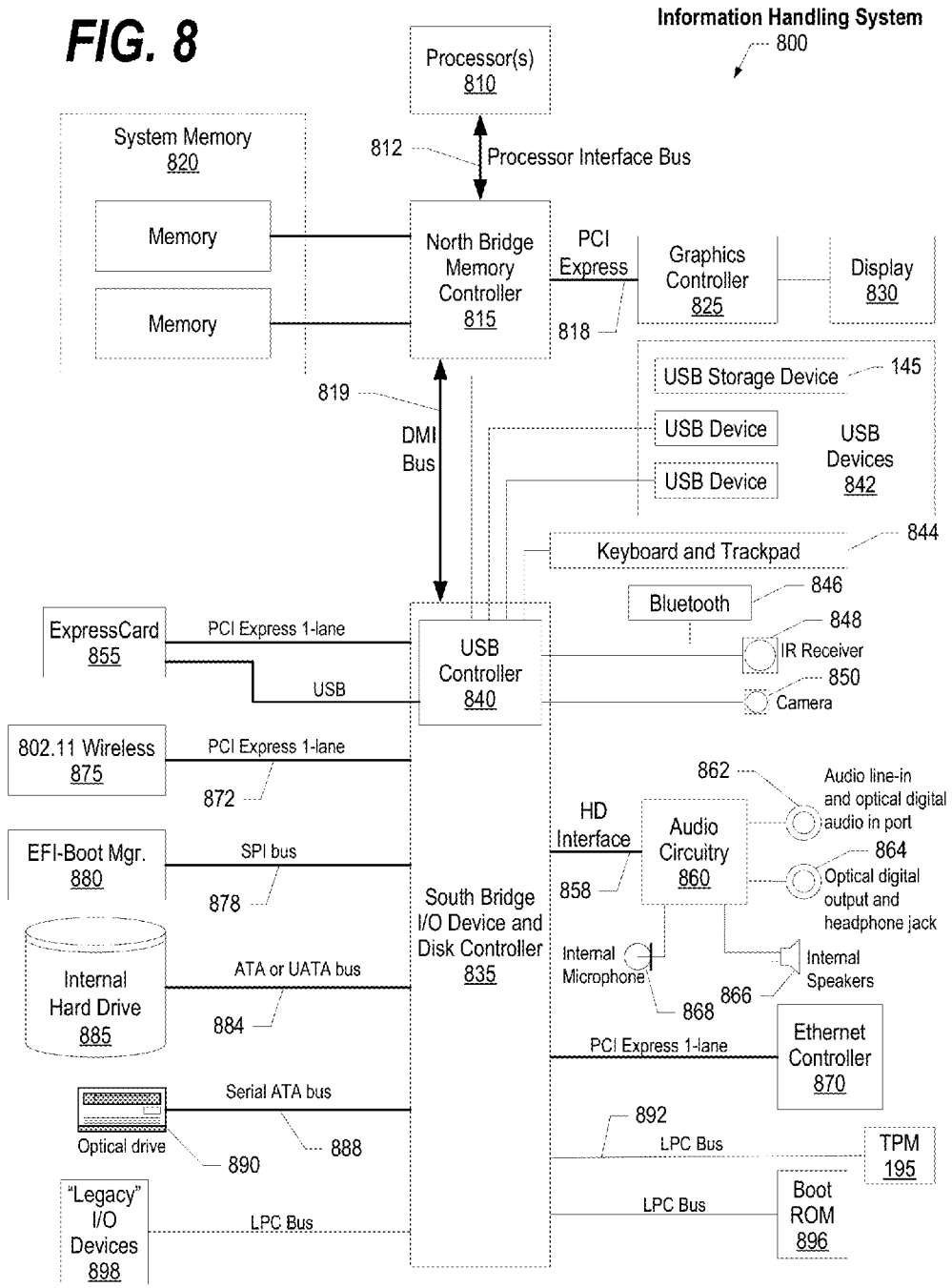

ENHANCED CASE-SPLITTING BASED PROPERTY CHECKING

BACKGROUND

The present disclosure relates to enhanced case-splitting based property checking during circuit design formal verification. More particularly, the present disclosure relates to using a combination of case-splitting, property checking, and sequential equivalence checking to formally verify a circuit design model.

Circuit designers utilize a wide range of verification techniques to verify various stages of a circuit design as the circuit design migrates through different levels of design abstraction. Property checking is typically used to verify a circuit design model (e.g., register transfer language (RTL) model) against a circuit design specification. In particular, property checking verifies whether the circuit design model conforms to properties specified in the circuit design specification. As those skilled in the art can appreciate, a property is a set of assertions about design behavior of the circuit design under various sets of input conditions.

Sequential equivalence checking compares a validated model (e.g., a "reference model") against a sequentially modified derivation of the validated model (e.g., a "model under verification") to determine whether the model under verification is sequentially equivalent to the reference model. In general, sequential equivalence checking is more "expensive" in terms of time and processor resources compared with property checking. However, if the two models being compared have structural similarity, sequential equivalence checking may require less time and less resources than property checking.

BRIEF SUMMARY

According to one embodiment of the present disclosure, an approach is provided in which a model verification system partitions one of a design specification's circuit design properties into multiple unsolved cases. The model verification system then performs property checking on one of the unsolved cases against a corresponding circuit design model, which results in a property checked solved case and a subset of unsolved cases. In turn, the model verification system performs sequential equivalence checking on one or more of the subset of unsolved cases by checking their sequential equivalence against the property checked solved case. As a result, the model verification system stores the cases as sequentially equivalent solved cases and verifies of a portion of the design specification against a portion of the circuit design model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 6 shows one example of pseudo code that performs property checking and sequential equivalence checking on unsolved cases in a serial manner;

FIG. 7 shows one example of pseudo code that performs property checking and sequential equivalence checking on unsolved cases in a parallel manner;

FIG. 8 is a block diagram of a data processing system in which the methods described herein can be implemented.

DETAILED DESCRIPTION

Figure 1:
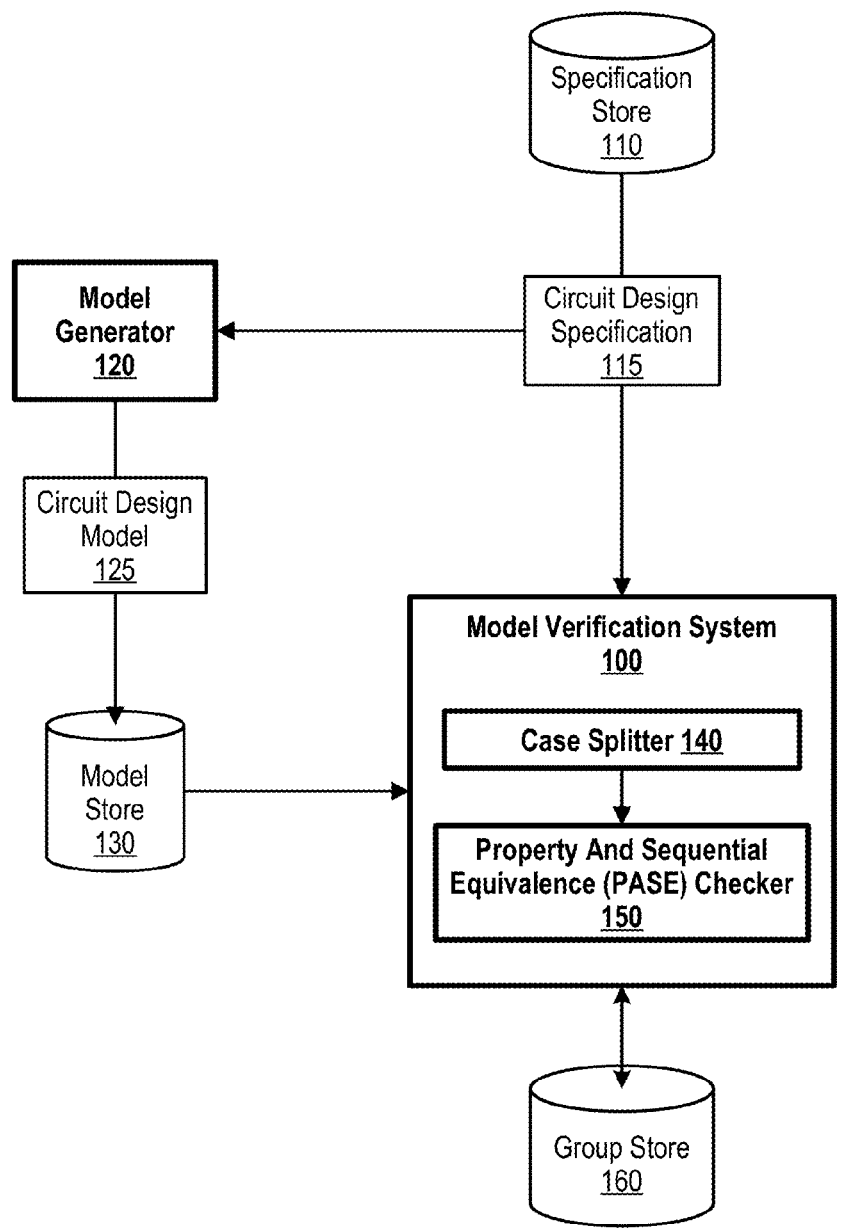
FIG. 1 is a diagram depicting one example of a model verification system using a combination of case splitting, property checking, and sequential equivalence checking to verify a circuit design model against a circuit design specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram depicting one example of a model verification system using a combination of case splitting, property checking, and sequential equivalence checking to verify a circuit design model against a circuit design specification. As described herein, model verification system 100 splits a design specification property into unsolved cases and solves the unsolved cases using property checking techniques as well as sequential equivalence checking techniques. Since sequential equivalence checking typically requires less time and less resources than property checking when two entities being compared have structural similarity, model verification system 100 reduces the overall amount of time and resources required to verify a circuit design model compared with traditional model verification approaches.

Model generator 120 retrieves circuit design specification from specification store 110 and generates circuit design model 125. As those skilled in the art can appreciate, circuit design specification 115 includes properties that describe design functionality of a circuit, and circuit design model 115 is a finite state machine representation of circuit design specification 115, such as an RTL model.

Model verification system 100 retrieves design specification 115 from specification store 110, and retrieves design model 125 from model store 130. Model verification system 100 then identifies a property in design specification 115 and splits the property into unsolved cases via case splitter 140. As those skilled in the art can appreciate, case splitting decomposes a complex verification task into a set of simpler tasks by reducing the state space of the verification task into a subset of state spaces. For example, a property with three inputs may be split into eight unsolved cases ($2^3$=8, see FIGS. 2, 3 and corresponding text for further details).

The unsolved cases feed into property and sequential equivalence (PASE) checker 150. PASE 150 begins formal verification by performing property checking on one of the unsolved cases. When the unsolved case passes property checking, PASE checker 150 creates a "solved cases group" in group store 160 and stores the "property checked solved case" in the solved cases group. As those skilled in the art can appreciate, property checking involves a complete search through the state space of the design model to ensure that the design behavior in the design description's property (unsolved case being property checked) is always as asserted.

Once PASE checker 150 has created a solved cases group that includes one or more solved cases, PASE checker 150 performs sequential equivalence checking on subsequent unsolved cases against a selected one of the solved cases in the group (since all cases in a particular solved cases group are sequentially equivalent, discussed below). When an unsolved case passes sequential equivalence checking, the case is stored in the solved cases group as a sequentially equivalent solved case. When an unsolved case fails sequential equivalence checking, PASE checker 150 may identify a different group of solved cases, select a different solved case from the different group, and perform sequential equivalence checking on the unsolved case using the selected different solved case.

When PASE checker 150 determines that solving a particular case would be more efficient through property checking (e.g. after performing sequential equivalence checking using selected solved cases from multiple solved groups), PASE checker 150 performs property checking on the unsolved case and creates a new solved group in group store 160. In short, PASE checker 150 performs sequential equivalence checking and/or property checking on unsolved cases as needed to verify each unsolved case in a particular property and, in turn, formally verify circuit design model 125 against circuit design specification 115 (see FIGS. 4, 5, and corresponding text for further details).

Figure 2:
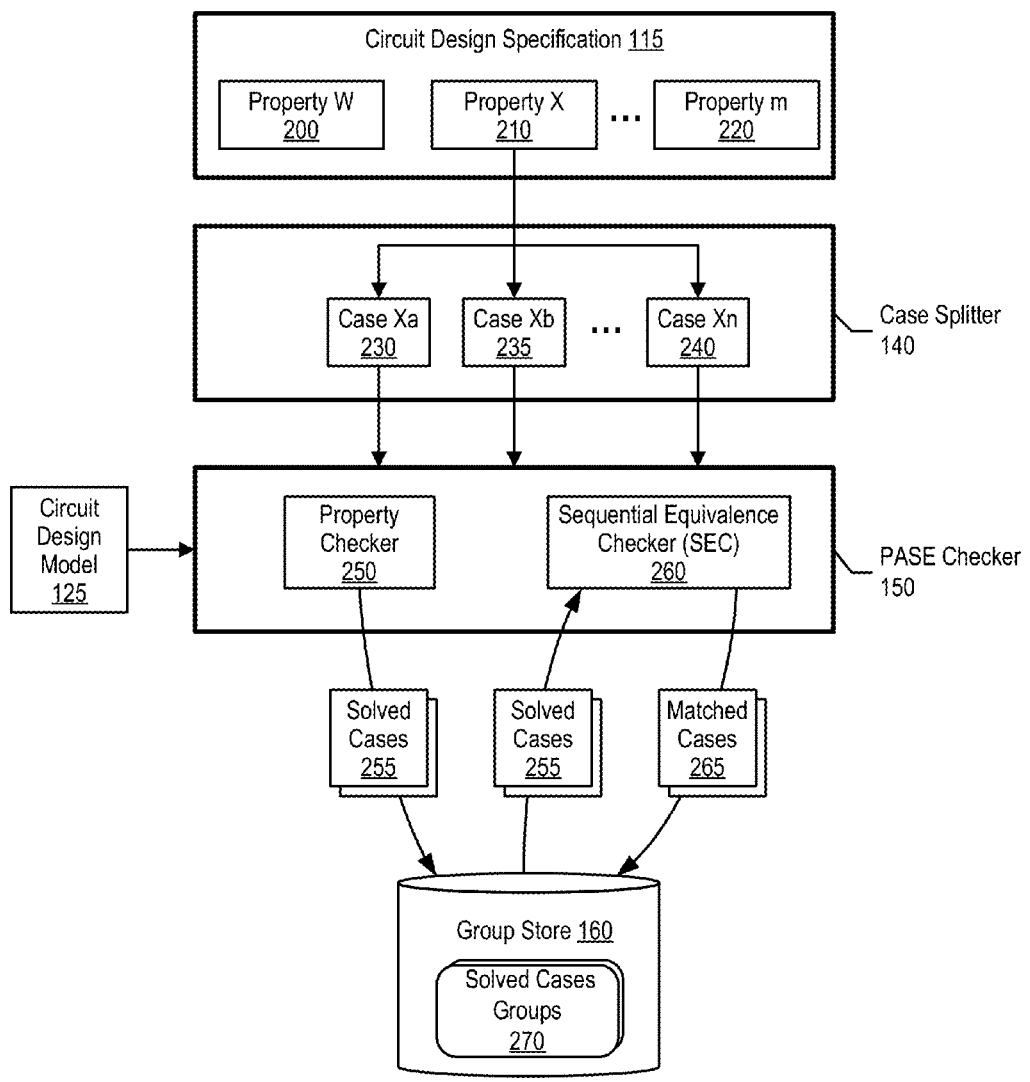
FIG. 2 is a diagram depicting one example of a model verification system's components splitting a design specification property into unsolved cases and performing property checking or sequential equivalence checking on each unsolved case.

FIG. 2 is a diagram depicting one example of model verification system 100's components that split a circuit design specification's property into unsolved cases and perform property checking or sequential equivalence checking on each unsolved case. Circuit design specification 115 includes properties 200, 210, and 220, each of which defines a set of assertions about the behavior of circuit design specification 115 (e.g., a particular set of inputs results generates a particular set of outputs).

To effectively verify circuit design model 125 against circuit design specification 115, case splitter 140 selects one of circuit design specification 115's properties and splits the selected property into unsolved cases. The example shown in FIG. 2 shows that case splitter 140 splits property X 210 into case Xa 230 through case Xn 240, thus reducing the state space of property X 210 into multiple smaller state spaces (reduces property X 210's initial states into a subset of initial states).

PASE checker 150 analyzes each unsolved case and performs property checking (via property checker 250) or sequential equivalence checking (via sequential equivalence checker 260) accordingly. When PASE checker 150 performs property checking on an unsolved case (assuming the case passes), PASE checker 150 stores the new property checked solved case (solved case 255) in a new in one of solved cases groups 270 located in group store 160.

When PASE checker 150 analyzes a subsequent unsolved case, PASE checker 150 identifies one of solved cases groups 270 (discussed in detail below) and selects a stored solved case from the identified solved cases group (solved case 255). Sequential equivalence checker 260 performs sequential equivalence checking between the unsolved case and the selected solved case (either a property checked solved case or a sequentially equivalent solved case). As those skilled in the art can appreciate, each solved case included in a particular solved cases group is sequentially equivalent and, therefore, sequential equivalence checker 260 checks an unsolved case with one of the solved cases in a particular one of solved cases groups 270.

When sequential equivalence checker 260 identifies a match, sequential equivalence checker 260 stores the matched sequentially equivalent solved case in the same group as the solved case to which it was matched. As discussed in more detail below, PASE checker 150 may execute multiple iterations of sequential equivalence checking prior to finding a match for an unsolved case, or may perform property checking on the unsolved case if PASE checker 150 is unable to identify a sequentially equivalent match before a pre-defined time limit expires (see FIGS. 4, 5, and corresponding text for further details).

Figure 3:
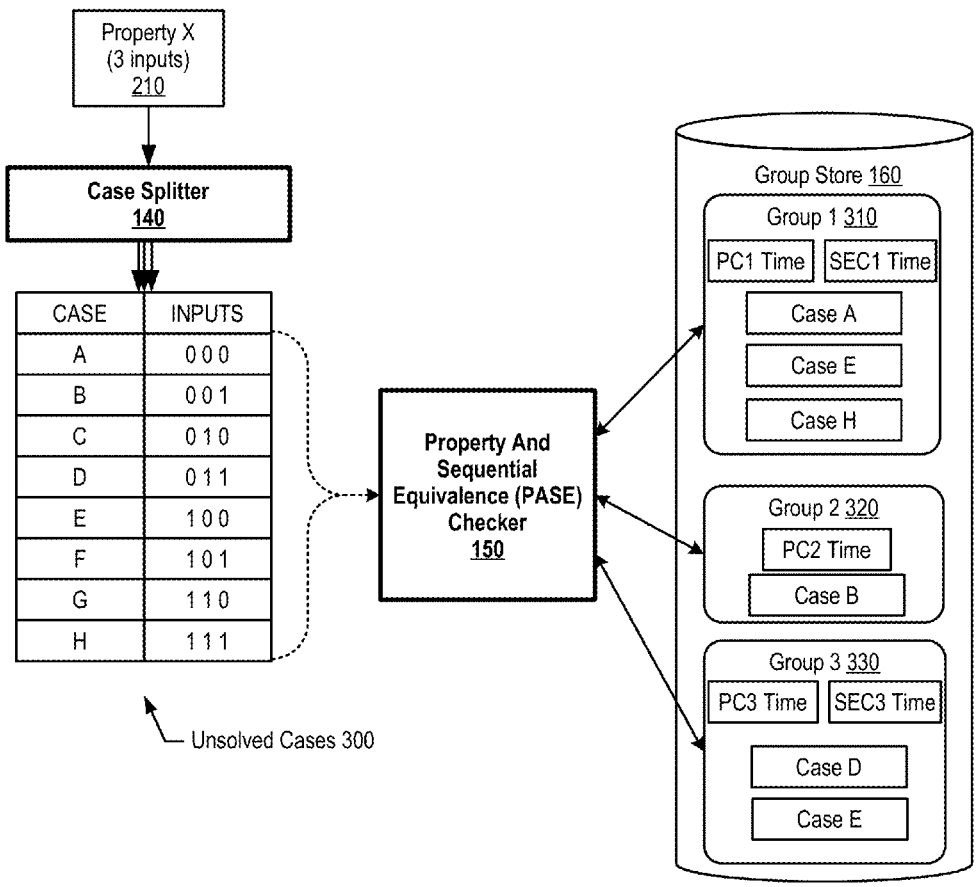
FIG. 3 is a diagram depicting one example of a case splitter splitting a property into unsolved cases and a property and sequential equivalence (PASE) checker performing property checking or sequential equivalence checking on each unsolved case.

FIG. 3 is a diagram depicting one example of a case splitter splitting a property into unsolved cases and a PASE checker performing property checking or sequential equivalence checking on each unsolved case. The example shown in FIG. 3 shows that property X 210 includes three inputs. As such, case splitter 140 splits property X 210 into eight different unsolved cases A through H 300 ($2^3$=8).

PASE checker 150 performs property checking or sequential equivalence checking on each of the cases and stores solved cases in three different groups (310, 320, and 330). Group 1 310 includes three sequentially equivalent solved cases. For example, case A may have been property checked, case E may have been sequential equivalence checked against case A, and case H may have been sequential equivalence checked against case A or case E. In one embodiment, when one solved case is included in a group, the solved case will be a property checked solved case, such as group 2 320 shown in FIG. 3.

Each of the groups also includes an amount of time taken to perform property checking (PC Time) and an amount of time taken to perform sequential equivalence checking (SEC Time) if applicable. In turn, PASE checker 150 evaluates the time requirements, as well as other structural design attributes and/or semantic analysis attributes, for the different solved cases groups to determine which group to attempt property checking and/or sequential equivalence checking on a new unsolved case (see FIGS. 4, 5, and corresponding text for further details).

Figure 4:
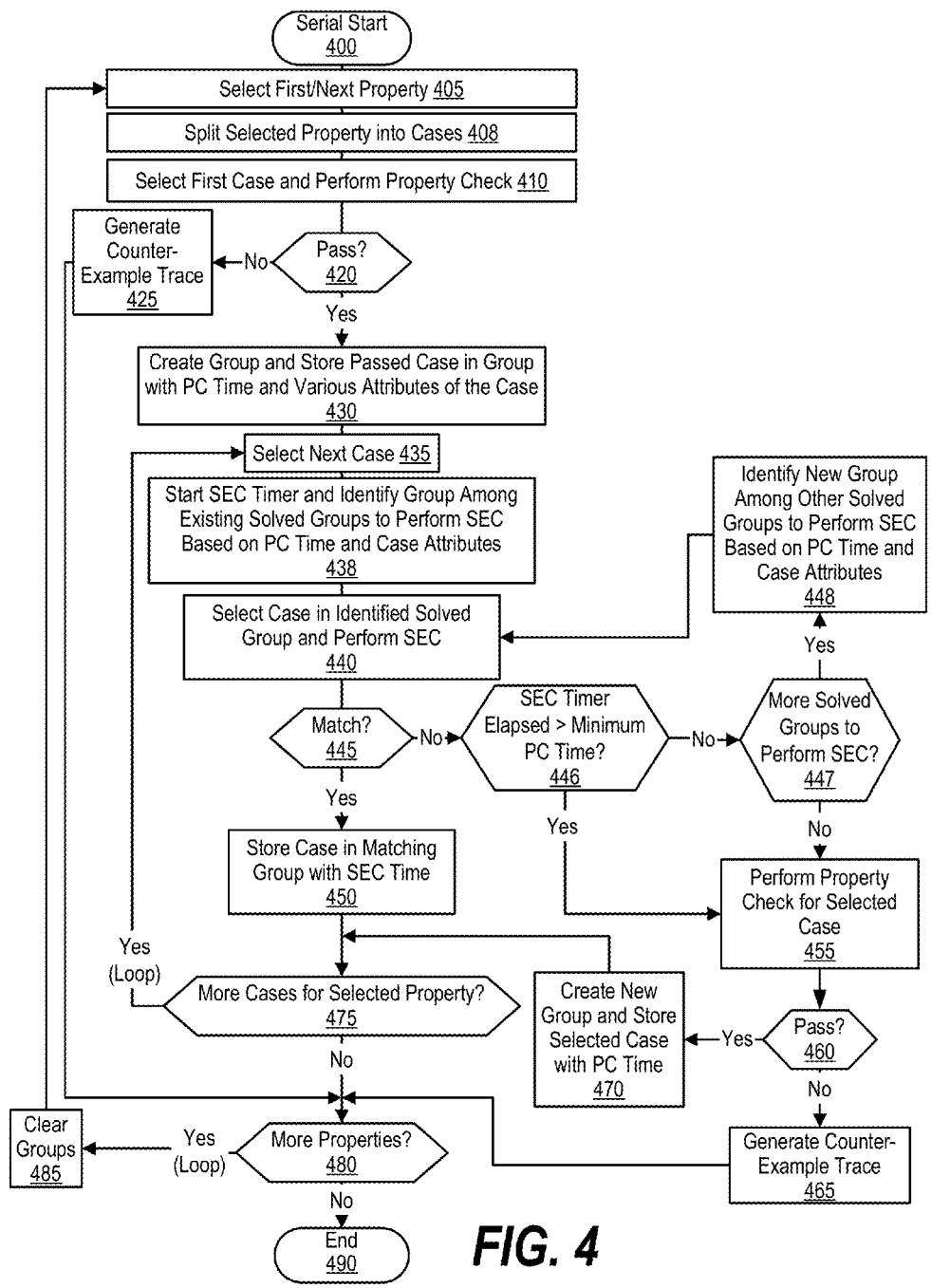
FIG. 4 depicts a flowchart showing one example of a model verification system using a serial approach to splitting a property into unsolved cases and performing property checking and sequential equivalence checking on each unsolved case.
Figure 5:
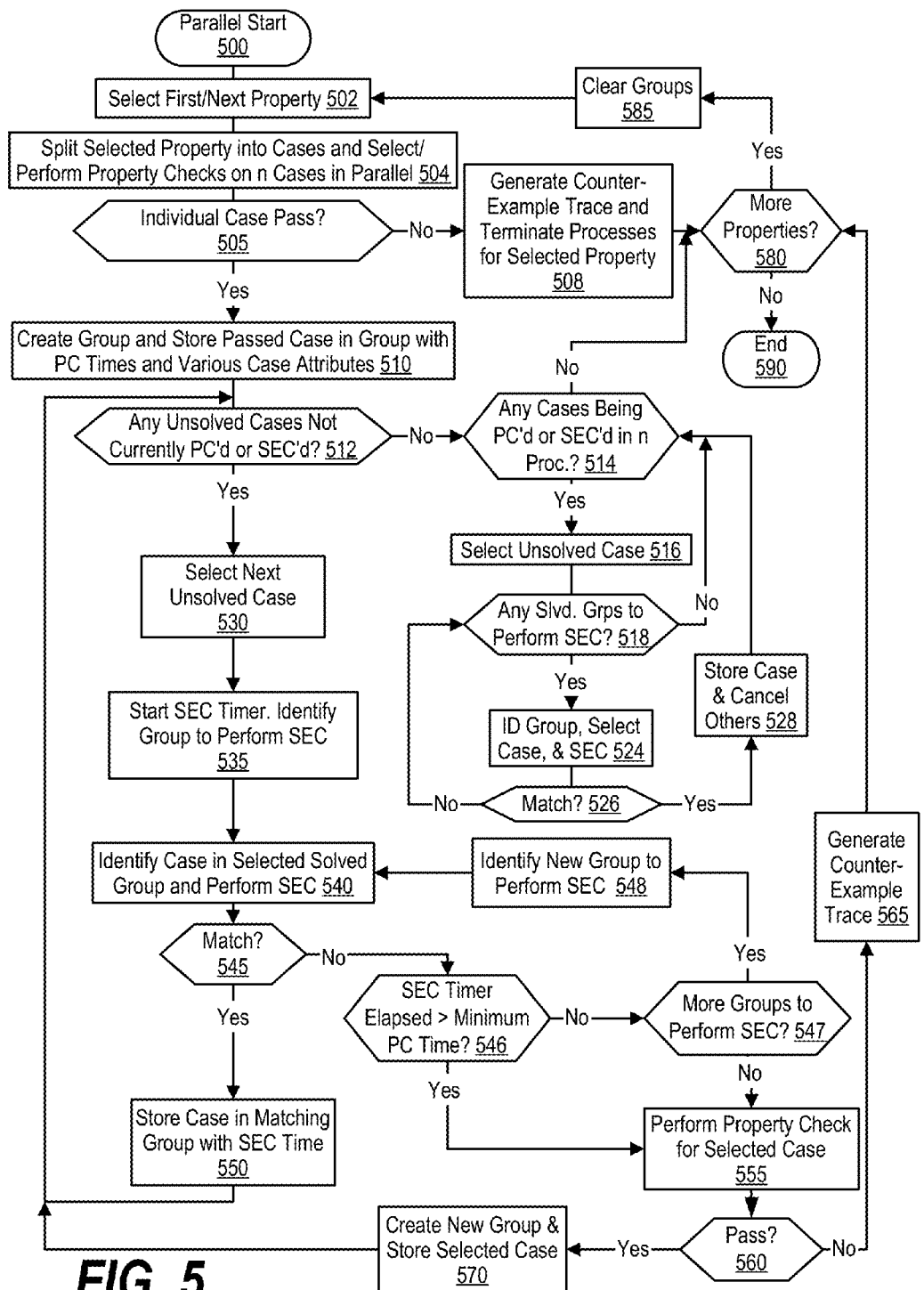
FIG. 5 depicts a flowchart showing one example of a model verification system using a parallel approach to splitting a property into unsolved cases and performing property checking and sequential equivalence checking on each unsolved case.

FIGS. 4 and 5 depict examples of flowcharts showing steps taken by model verification system 100 to partition a circuit design specification's property into unsolved cases and solve the unsolved cases using property checking and/or sequential equivalence checking. Model verification system 100 may perform the system and methods discussed herein using a variety of processor configurations. In one embodiment, model verification system 100 may utilize a single processor executing a single thread or multiple threads. In another embodiment, model verification system 100 may utilize multiple processors executing multiple threads.

FIG. 4 depicts a flowchart showing one example of the model verification system using a serial approach to splitting a property into unsolved cases and performing property checking and sequential equivalence checking on each unsolved case. Processing commences at 400, whereupon the model verification system selects a first property in circuit design specification 115 (405). At 408, the model verification system splits the selected property into unsolved cases to separate the selected property's initial states into smaller subsets of initial states.

The model verification system selects the first unsolved case at 410 and performs property checking on the selected unsolved case, which checks a particular portion of circuit design specification 115 against a particular portion of corresponding circuit design model 125. A determination is made as to whether the selected unsolved case passed property checking (decision 420). In one embodiment, the model verification system records the time taken for property checking the first case as the minimum property checked time as well as the maximum property checked time. If the selected unsolved case does not pass property checking, decision 420 branches to the "No" branch, whereupon, at 425, the model verification system generates a counter-example trace showing a scenario in which the property fails, and a determination is made as to whether there are more properties to check (decision 480, discussed below). In one embodiment, the counter example trace shows valuation of inputs to the design over time leading to the property violation (e.g., if the design is simulated by applying the input valuations, the simulation results in the property failing).

On the other hand, if the selected unsolved case passes the property check, decision 420 branches to the "Yes" branch, whereupon the model verification system creates a "solved cases group" (430) and stores the first case (property checked solved case), the amount of time take to perform property checking on the first case (property checking time), and other various attributes of the case in the new solved cases group (see FIG. 3 and corresponding text for further details). Other stored attributes may include structural design attributes, such as the number of state-holding elements, the number of memories, the number of combinational gates, the number of levels in the combinational logic, etc. The stored attributes may also include results of semantic analysis on the design, such as diameter estimation of the design, the number of state-holding elements with the same name across the two cases that have same simulation signatures, etc.

The model verification system selects the next unsolved case (from the subset of remaining unsolved cases) at 435. At 438, the model verification system starts a sequential equivalence checking (SEC) timer and identifies a group among existing solved cases groups (just one solved cases group may exist at this point) to perform sequential equivalence checking based upon the group's property checking (PC) time and case attributes (e.g., selecting a group with the maximum (longest) property checked time).

At 440, the model verification system selects a solved case included in the identified solved cases group. In one embodiment, the model verification system selects a solved case based on structural attributes and initial analysis for sequential equivalence checking. Sequential equivalence checking is most successful when structural similarity exists between two designs being sequential equivalence checked. For example, one way to quickly check structural similarity is to perform bit-parallel simulation on the two designs and compare the simulation signatures of identically named state-holding elements across the two designs (e.g., the higher the similarity, the better the chance of sequential equivalence checking succeeding).

A determination is made as to whether the sequential equivalence checking matched the selected unsolved case to the solved case (sequentially equivalent) (decision 445). If the sequential equivalence checking matched the two cases, decision 445 branches to the "Yes" branch, whereupon processing stores the newly solved case (sequentially equivalent solved case) in the same group that includes the solved case used during sequential equivalence checking (450). As such, the sequentially equivalent solved case is not required to be property checked (inhibited from being property checked).

On the other hand, if the sequential equivalence checking did not result in a match, decision 445 branches to the "No" branch, whereupon a determination is made as to whether the amount of time elapsed for sequential equivalence checking is greater than the minimum property checked time (e.g., shortest existing property checked time) (decision 446). If the amount of time elapsed for sequential equivalence checking is greater than the minimum property checked time, decision 446 branches to the "Yes" branch, whereupon processing stops performing sequential equivalence checking and performs property checking on the selected unsolved case (455). The time taken for property checking is recorded and the minimum or maximum property checked time is updated, if necessary.

On the other hand, if the amount of elapsed sequential equivalence checking time is not greater than the minimum property checked time, decision 446 branches to the "No" branch, whereupon a determination is made as to whether there are any more solved groups for which to perform sequential equivalence checking (decision 447). If there are more solved groups, decision 447 branches to the "Yes" branch, whereupon processing identifies a new group based upon the group's property checked time and case attributes (448), and performs sequential equivalence checking using one of the solved cases in the identified group. This looping continues until there are no more solved groups on which to perform sequential equivalence checking (or the sequential equivalence checking identifies a match at decision 445), at which point decision 447 branches to the "No" branch, whereupon processing performs property checking on the selected case (455).

A determination is made as to whether the selected unsolved case passed property checking (decision 460). If the selected unsolved case did not pass property checking, decision 460 branches to the "No" branch, whereupon processing generates a counter-example trace at 465 to show the selected case's property checking violation. On the other hand, if the selected case passed property checking, decision 460 branches to the "Yes" branch, whereupon processing creates a new group and stores the newly solved case in the new group (along with the amount of time and resources required to perform the property checking).

A determination is made as to whether there are more unsolved cases from the selected property for which to analyze (decision 475). If there are more unsolved cases to analyze, decision 475 branches to the "Yes" branch, whereupon processing loops back to select an analyze the next unsolved case. This looping continues until there are no more unsolved cases to analyze for the selected property, at which point decision 475 branches to the "No" branch, whereupon a determination is made as to whether there are more properties in the design specification to spilt into unsolved cases and analyze (decision 480). If there are more properties to split and analyze, decision 480 branches to the "Yes" branch, which loops back to clear the solved cases groups (485) and process the next property. This looping continues until there are no more properties to analyze, at which point decision 480 branches to the "No" branch and processing ends at 490.

FIG. 5 depicts a flowchart showing one example of the model verification system taking a parallel approach to splitting a property into unsolved cases and performing property checking and sequential equivalence checking on each unsolved case. Processing commences at 500, whereupon the model verification system selects a first property in design specification 115 (502). At 504, processing splits the selected property into unsolved cases to separate the selected property's initial states into smaller subsets of initial states, and performs property checking on "n" number of cases, where n is the number of processes running in parallel (e.g., processor cores, processor threads, etc.). The time taken for property checking is recorded whenever a case is solved via property checking and the minimum and maximum property checked time is updated as needed.

A determination is made, for each "n" individual unsolved case, as to whether the selected unsolved case passed property checking (decision 505). If an unsolved case does not pass property checking, decision 505 branches to the "No" branch, whereupon processing generates a counter-example trace and, since one of the unsolved cases failed property checking, processing for each unsolved case corresponding to the same property is terminated (508), and a determination is made as to whether there are more properties to split into cases and analyze (decision 580). If there are more properties to split into cases and analyze, decision 580 branches to the "Yes" branch, whereupon the model verification system clears the solved cases groups at 585, and selects the next property at 502. On the other hand, if there are no more properties to analyze, decision 580 branches to the "No" branch, whereupon processing ends at 590.

Referring back to decision 505, if an unsolved case passes property checking, decision 505 branches to the "Yes" branch, whereupon the model verification system creates a "solved cases group" and stores the solved case, along with relevant timing and attribute information, in the solved cases group (510).

A determination is made as to whether there are any unsolved cases that are not being actively property checked or sequential equivalence checked in one of the n processors (decision 512). If each of the unsolved cases are currently being analyzed, decision 512 branches to the "No" branch, whereupon a determination is made as to whether there are any cases that are being processed in any of the n processors (decision 514). If there are no unsolved cases being processed, indicating that the model verification system is finished analyzing each of the unsolved cases corresponding to the selected property, decision 514 branches to the "No" branch, whereupon a determination is made as to whether there are more properties to split into unsolved cases (decision 580).

On the other hand, if there are unsolved cases being processed by the n processors, decision 514 branches to the "Yes" branch, whereupon steps are performed to allocate unused processing resources to speed up analysis of the unsolved cases. At step 516, processing selects one of the unsolved cases that is presently being property checked or sequential equivalence checked, and a determination is made as to whether there are existing solved groups that have not been sequential equivalence checked against the selected case (decision 518).

If there are no more solved groups that have not been sequential equivalence checked against the selected case, decision 518 branches to the "No" branch, which loops back to determine whether there are any more unsolved cases to analyze. On the other hand, if there are solved groups that have not been sequential equivalence checked against the selected case, decision 518 branches to the "Yes" branch, whereupon processing identifies a solved group among the existing solved groups to perform sequential equivalence checking based on property checked times and case attributes, and performs sequential equivalence checking on a selected solved case included in the identified group (524).

A determination is made as to whether the sequential equivalence checking results in a match (decision 526). If the sequential equivalence checking does not result in a match, decision 526 branches to the "No" branch, which loops back to identify another solved group to perform sequential equivalence checking on a selected solved case in the identified group.

On the other hand, if the sequential equivalence checking produces a match, decision 526 branches to the "Yes" branch, which stores the matched case in the matched group and terminates other n processors that are performing property checking or sequential equivalence checking on the matched case (528).

Referring back to decision 512, if there are other cases that are not currently being analyzed by one of the n processors, decision 512 branches to the "Yes" branch, whereupon processing selects the next unsolved case at 530. At 535, processing starts a sequential equivalence checking (SEC) timer and identifies a group among existing solved groups to perform SEC based upon the identified group's property checking (PC) time and case attributes (e.g., selecting a group with the maximum property checked time).

At 540, processing identifies a solved case included in the selected group and performs sequential equivalence checking between the solved case and the selected unsolved case. A determination is made as to whether the sequential equivalence checking matched the selected unsolved case to the solved case (sequentially equivalent) (decision 545). If the sequential equivalence checking matched the two cases, decision 545 branches to the "Yes" branch, whereupon processing stores the newly solved case (sequentially equivalent solved case) in the same group as the solved case used during sequential equivalence checking (550).

On the other hand, if the sequential equivalence checking did not indicate a match, decision 545 branches to the "No" branch, whereupon a determination is made as to whether the amount of time elapsed for sequential equivalence checking is greater than the minimum property checked time, which is the minimum property checked time recorded so far corresponding to the selected property (decision 546). If the amount of time elapsed for sequential equivalence checking is greater than the minimum property checked time, decision 546 branches to the "Yes" branch, whereupon processing stops performing sequential equivalence checking and performs property checking on the selected unsolved case (555).

On the other hand, if the amount of sequential equivalence checking time elapsed is not greater than the minimum property checked time, decision 546 branches to the "No" branch, whereupon a determination is made as to whether there are any more solved groups for which to perform sequential equivalence checking (decision 547). If there are more solved groups, decision 547 branches to the "Yes" branch, whereupon processing identifies a new group based upon the group's property checked time and case attributes (548), and performs sequential equivalence checking using one of the solved cases in the identified group. This looping continues until there are no more solved groups on which to perform sequential equivalence checking (or the sequential equivalence checking identifies a match at decision 545), at which point decision 547 branches to the "No" branch, whereupon processing performs property checking on the selected case (555). The time taken for property checking is recorded and the minimum or maximum property checked time is updated as needed.

A determination is made as to whether the selected case passed property checking (decision 560). If the selected case did not pass property checking, decision 560 branches to the "No" branch, whereupon processing generates a counter example trace at 565 to show the selected case's property checking violation. On the other hand, if the selected case passed property checking, decision 560 branches to the "Yes" branch, whereupon processing creates a new group and stores the newly solved case in the new group at 570 (along with the amount of time and resources required to perform the property checking).

In turn, processing loops back to decision 512 to determine if there are any more unsolved cases not currently being property checked or sequential equivalence checked. The steps performed in FIG. 5 continue until there are no more properties to split into cases and analyze (decision 580), at which point parallel processing ends at 590.

FIG. 6 shows one example of pseudocode used to perform property checking and sequential equivalence checking on unsolved cases in a serial manner. Code 600 includes line 610, which selects an unsolved case and property checks the selected unsolved case. Lines 615 determine whether the property check passed by determining if the property check generated a counter example. If so, the process ends.

When a property check passes, line 620 sets T_pc_i at the amount of time the property check took to perform. Lines 625 create a solved group, increments the number of solved groups, and moves the newly passed case into the new group. Line 630 adds the time the property check time to the new group, and line 635 updates the minimum property check time if the new property check time is less than the current minimum property check time.

Line 640 selects a solved cases group having a maximum property checking time (for greatest time saving benefit) and case attributes. Line 645 selects one of the cases included in the group (since all cases within a particular group are sequentially equivalent). Line 650 moves the case under test to the selected group if the sequential equivalence checking results in a match.

If the case does not match via sequential equivalence checking, lines 655 determine whether the amount of time performing sequential equivalence checking is greater than the currently logged minimum property checked time. If so, processing exits sequential equivalence checking and performs property checking on the case. If the amount of time performing sequential equivalence checking is not greater than the minimum property checked time, lines 660 select the next group based on property checked times and performs sequential equivalence checking on the newly selected group.

As those skilled in the art can appreciate, other approaches of pseudo code may be written to perform the steps discussed herein than what is shown in FIG. 6.

FIG. 7 shows one example of pseudocode used to perform property checking and sequential equivalence checking on unsolved cases in a parallel manner. Code 700 includes instructions that are similar to code 600 shown in FIG. 6, but also includes code specific to the parallel processing aspects of analyzing unsolved cases. Lines 720 determine whether a counter example has been generated for a particular property and terminates corresponding processes accordingly (step 508 in FIG. 5).

Lines 730 and 735 property checks an unsolved case when the amount of time spent sequential equivalence checking an unsolved case exceeds the minimum property checking time (steps 546 and 555 shown in FIG. 5). And, lines 740 allocate available processing resources to unsolved cases currently under analysis (e.g., steps 514 through 528 shown in FIG. 5).

FIG. 8 illustrates information handling system 800, which is a simplified example of a computer system capable of performing the computing operations described herein. Information handling system 800 includes one or more processors 810 coupled to processor interface bus 812. Processor interface bus 812 connects processors 810 to Northbridge 815, which is also known as the Memory Controller Hub (MCH). Northbridge 815 connects to system memory 820 and provides a means for processor(s) 810 to access the system memory. Graphics controller 825 also connects to Northbridge 815. In one embodiment, PCI Express bus 818 connects Northbridge 815 to graphics controller 825. Graphics controller 825 connects to display device 830, such as a computer monitor.

Northbridge 815 and Southbridge 835 connect to each other using bus 819. In one embodiment, the bus is a Direct Media Interface (DMI) bus that transfers data at high speeds in each direction between Northbridge 815 and Southbridge 835. In another embodiment, a Peripheral Component Interconnect (PCI) bus connects the Northbridge and the Southbridge. Southbridge 835, also known as the I/O Controller Hub (ICH) is a chip that generally implements capabilities that operate at slower speeds than the capabilities provided by the Northbridge. Southbridge 835 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 896 and "legacy" I/O devices (using a "super I/O" chip). The "legacy" I/O devices (898) can include, for example, serial and parallel ports, keyboard, mouse, and/or a floppy disk controller. The LPC bus also connects Southbridge 835 to Trusted Platform Module (TPM) 895. Other components often included in Southbridge 835 include a Direct Memory Access (DMA) controller, a Programmable Interrupt Controller (PIC), and a storage device controller, which connects Southbridge 835 to nonvolatile storage device 885, such as a hard disk drive, using bus 884.

ExpressCard 855 is a slot that connects hot-pluggable devices to the information handling system. ExpressCard 855 supports both PCI Express and USB connectivity as it connects to Southbridge 835 using both the Universal Serial Bus (USB) the PCI Express bus. Southbridge 835 includes USB Controller 840 that provides USB connectivity to devices that connect to the USB. These devices include webcam (camera) 850, infrared (IR) receiver 848, keyboard and trackpad 844, and Bluetooth device 846, which provides for wireless personal area networks (PANs). USB Controller 840 also provides USB connectivity to other miscellaneous USB connected devices 842, such as a mouse, removable nonvolatile storage device 845, modems, network cards, ISDN connectors, fax, printers, USB hubs, and many other types of USB connected devices. While removable nonvolatile storage device 845 is shown as a USB-connected device, removable nonvolatile storage device 845 could be connected using a different interface, such as a Firewire interface, etcetera.

Wireless Local Area Network (LAN) device 875 connects to Southbridge 835 via the PCI or PCI Express bus 872. LAN device 875 typically implements one of the IEEE 802.11 standards of over-the-air modulation techniques that all use the same protocol to wireless communicate between information handling system 800 and another computer system or device. Optical storage device 890 connects to Southbridge 835 using Serial ATA (SATA) bus 888. Serial ATA adapters and devices communicate over a high-speed serial link. The Serial ATA bus also connects Southbridge 835 to other forms of storage devices, such as hard disk drives. Audio circuitry 860, such as a sound card, connects to Southbridge 835 via bus 858. Audio circuitry 860 also provides functionality such as audio line-in and optical digital audio in port 862, optical digital output and headphone jack 864, internal speakers 866, and internal microphone 868. Ethernet controller 870 connects to Southbridge 835 using a bus, such as the PCI or PCI Express bus. Ethernet controller 870 connects information handling system 800 to a computer network, such as a Local Area Network (LAN), the Internet, and other public and private computer networks.

While FIG. 8 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 895) shown in FIG. 8 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 9.

Figure 9:
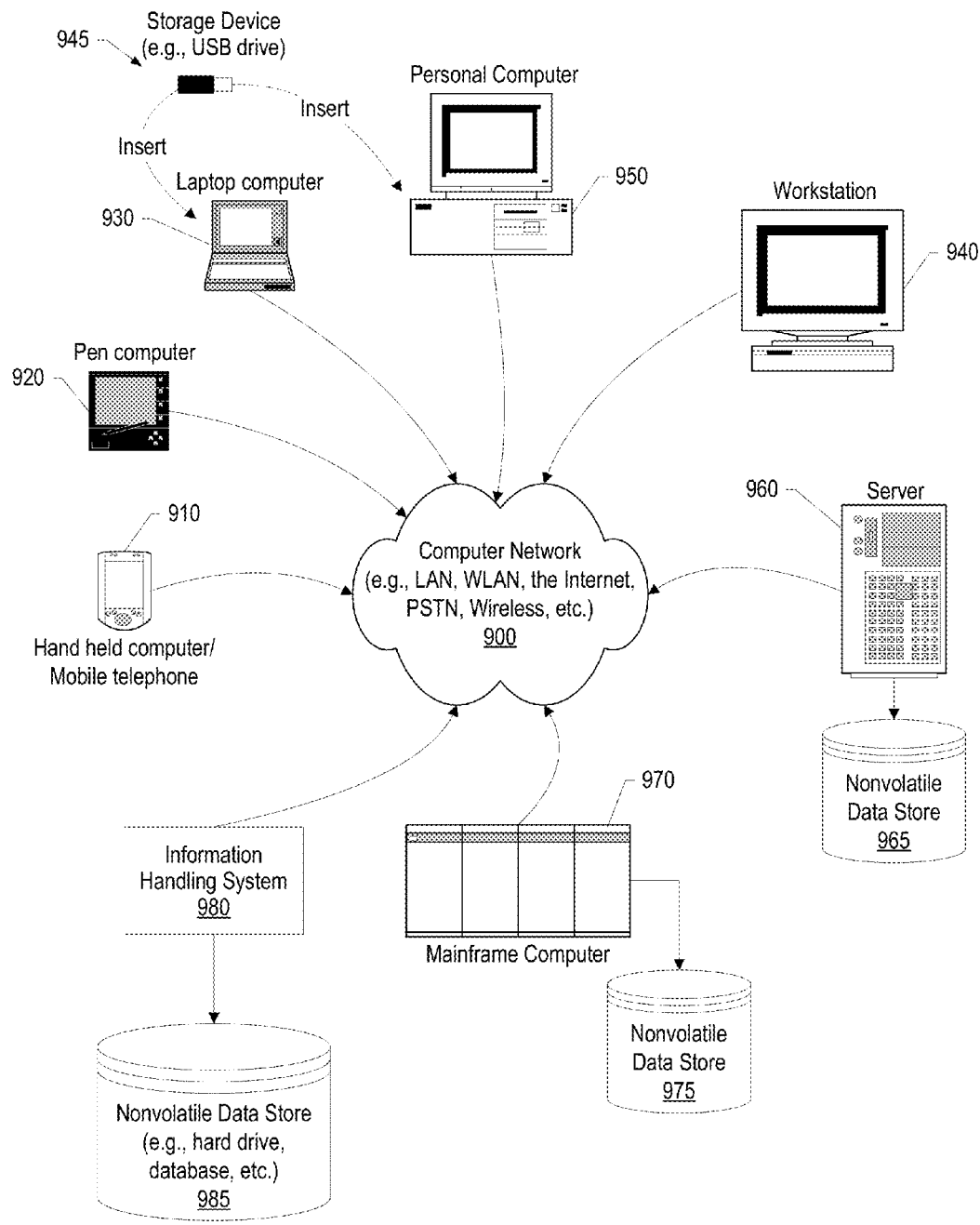
FIG. 9 provides an extension of the information handling system environment shown in FIG. 8 to illustrate that the methods described herein can be performed on a wide variety of information handling systems which operate in a networked environment.

FIG. 9 provides an extension of the information handling system environment shown in FIG. 8 to illustrate that the methods described herein can be performed on a wide variety of information handling systems that operate in a networked environment. Types of information handling systems range from small handheld devices, such as handheld computer/mobile telephone 910 to large mainframe systems, such as mainframe computer 970. Examples of handheld computer 910 include personal digital assistants (PDAs), personal entertainment devices, such as MP3 players, portable televisions, and compact disc players. Other examples of information handling systems include pen, or tablet, computer 920, laptop, or notebook, computer 930, workstation 940, personal computer system 950, and server 960. Other types of information handling systems that are not individually shown in FIG. 9 are represented by information handling system 980. As shown, the various information handling systems can be networked together using computer network 900. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 9 depicts separate nonvolatile data stores (server 960 utilizes nonvolatile data store 965, mainframe computer 970 utilizes nonvolatile data store 975, and information handling system 980 utilizes nonvolatile data store 985). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    partitioning a circuit design property into a plurality of unsolved cases, the circuit design property corresponding to a design specification;
    property checking, by one or more processors, a selected one of the plurality of unsolved cases against a circuit design model corresponding to the design specification, the property checking resulting in a property checked solved case and a subset of the plurality of unsolved cases;
    logging a property checked time that indicates an amount of time taken to perform the property checking of the selected unsolved case; and
    sequential equivalence checking, by at least one of the one or more processors, one or more of the subset of the plurality of unsolved cases against the property checked solved case, resulting in one or more sequentially equivalent solved cases and verification of a portion of the design specification against a portion of the circuit design model.

2. The method of claim 1 further comprising:
inhibiting property checking of the one or more sequentially equivalent solved cases.

3. The method of claim 1 wherein the property checking is performed on a plurality of the unsolved cases, resulting in a plurality of property checked solved cases and a different subset of the plurality of unsolved cases, the method further comprising:
for each of the plurality of property checked solved cases, logging the property checked time that indicates the amount of time required to property check the corresponding property checked solved case; and
creating a plurality of solved cases groups, wherein each of the plurality of solved cases groups includes at least one of the plurality of property checked solved cases and the corresponding property checked time.

4. The method of claim 3 further comprising:
identifying one of the plurality of solved cases groups that corresponds to a maximum property checked time;
selecting a solved case included in the identified solved cases group;
selecting one of unsolved cases included in the different subset of the plurality of unsolved cases;
sequential equivalence checking the selected unsolved case against the selected solved case; and
adding the selected unsolved case to the identified solved cases group as a new sequentially equivalent solved case in response to the selected unsolved case passing the sequential equivalence checking.

5. The method of claim 4 wherein the selected solved case included in the identified solved cases group is one of the one or more sequentially equivalent solved cases.

6. The method of claim 4 further comprising:
in response to the selected unsolved case failing the sequential equivalence checking, determining whether a sequential equivalence checking time is greater than a minimum property checked time corresponding to one of the plurality of solved cases groups;
in response to the sequential equivalence checking time being less than the minimum property checked time:
identifying a different one of the plurality of solved cases groups;
selecting a different solved case included in the different solved cases group; and
sequential equivalence checking the selected unsolved case against the different solved case.

7. The method of claim 6 wherein, in response to the sequential equivalence checking time exceeding the minimum property checked time, the method further comprises:
property checking the selected unsolved case, resulting in a new property checked solved case;
creating a new solved cases group;
adding the new property checked solved case to the new solved cases group;
logging a new property checked time of the new property checked solved case;
determining whether the new property checked time is longer than a maximum property checked time;
updating the maximum property checked time in response to determining that the new property checked time is longer than the maximum property checked time;
determining whether the new property checked time is shorter than a minimum property checked time; and
updating the minimum property checked time in response to determining that the new property checked time is shorter than the minimum property checked time.

8. The method of claim 1 wherein a plurality of processing threads perform sequential equivalence checking concurrently on two or more of the plurality of unsolved cases.

* * * * *